United States Patent [19]

Forbord

[11] Patent Number: 4,982,300
[45] Date of Patent: Jan. 1, 1991

[54] RESTRICTIVELY DAMPED ACTUATOR MOUNT FOR DISC DRIVES

[75] Inventor: Kent J. Forbord, Roseville, Minn.

[73] Assignee: Magnetic Peripherals Inc., Minneapolis, Minn.

[21] Appl. No.: 282,475

[22] Filed: Dec. 9, 1988

[51] Int. Cl.[5] .............................. G11B 5/55
[52] U.S. Cl. ........................ 360/106; 360/98.01
[58] Field of Search ........... 360/106, 104, 109, 98.01, 360/98.02, 98.07, 99.08, 78.04

[56] References Cited

U.S. PATENT DOCUMENTS

| | | | |
|---|---|---|---|
| 3,886,595 | 5/1975 | Swaim et al. | 360/106 |
| 4,117,997 | 10/1978 | Gitzendanner | 248/20 |
| 4,144,466 | 3/1979 | Hatch | 360/106 X |
| 4,216,505 | 8/1980 | Grant et al. | 360/104 |
| 4,443,824 | 4/1984 | Frater et al. | 360/104 |
| 4,553,231 | 11/1985 | d'Alayer de Costemore d'Arc | 369/263 |
| 4,657,361 | 4/1987 | Eitel et al. | 350/633 |
| 4,683,507 | 7/1987 | Roberts | 360/109 |
| 4,703,470 | 10/1987 | Castagna et al. | 369/215 |
| 4,742,256 | 5/1988 | Tanaka et al. | 360/106 X |
| 4,823,213 | 4/1989 | Naruki | 360/106 X |

Primary Examiner—A. J. Heinz
Assistant Examiner—Andrew L. Sniezek
Attorney, Agent, or Firm—Frederick W. Niebuhr; Edward P. Heller, III

[57] ABSTRACT

A magnetic disc drive includes a rigid housing, a plurality of data storage discs rotatably mounted in the housing, and a carriage for supporting and placing transducing heads in selected dispositions with respect to the rotating discs. An actuator or voice coil motor drives the carriage, and is fixed in the vertical direction to the housing by three posts extended upwardly of a deck portion of the housing and engaging the bottom of the actuator. A metallic plate mounted integrally to the actuator and a viscoelastic polymeric layer are interposed between the actuator and the deck adjacent the posts. The posts are sufficiently flexible to permit a limited horizontal displacement of the actuator with respect to the housing, responsive to movement of the carriage. The displacement causes shear strain in the viscoelastic layer whereby the layer tends to absorb and dissipate most of the energy of vibration.

13 Claims, 2 Drawing Sheets

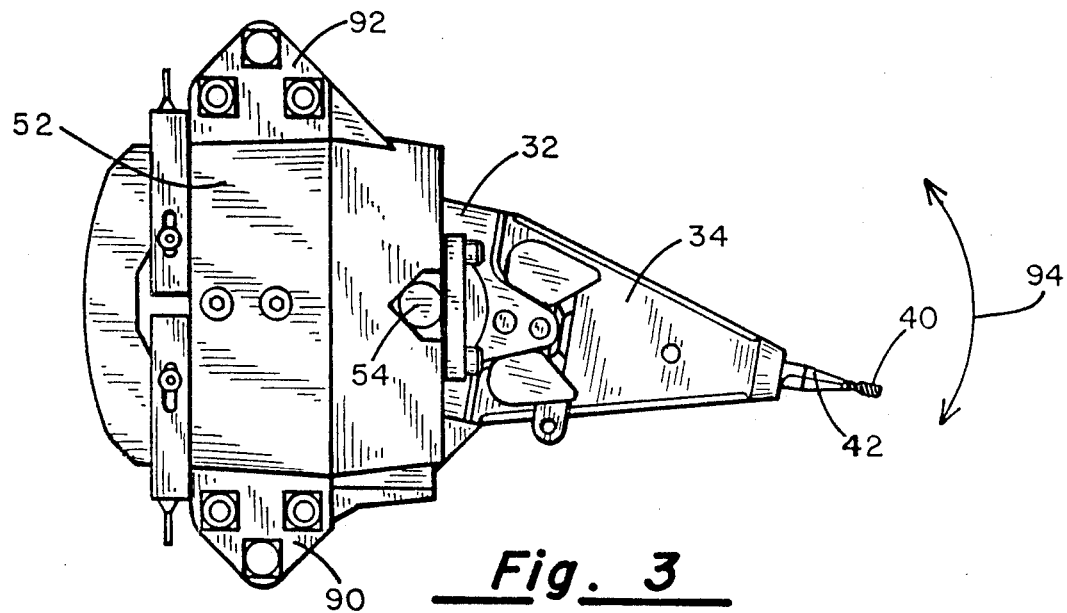
Fig. 3
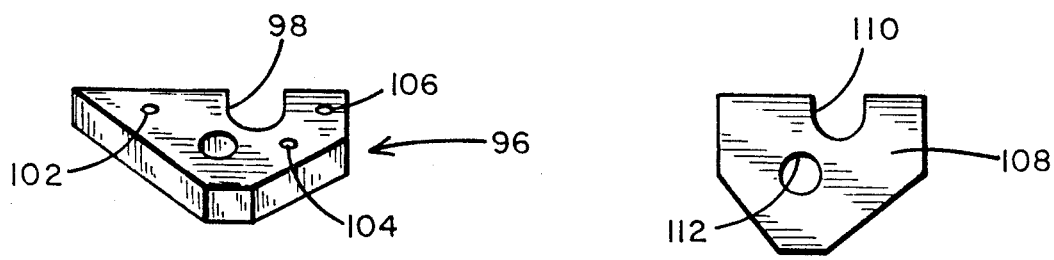
Fig. 4
Fig. 5
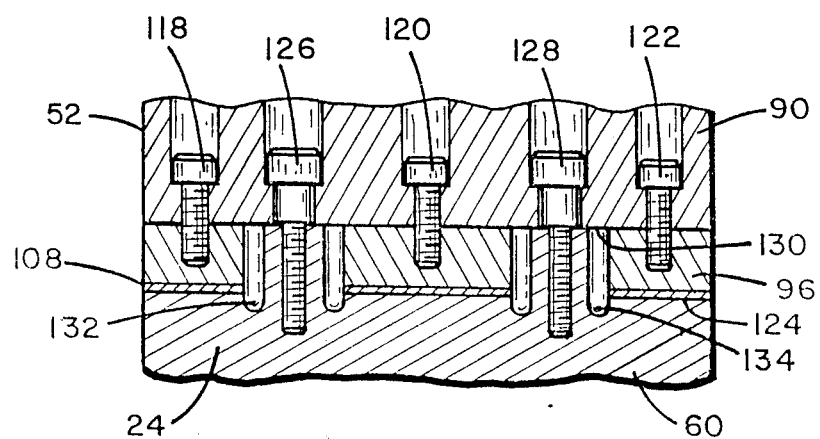
Fig. 6

RESTRICTIVELY DAMPED ACTUATOR MOUNT FOR DISC DRIVES

BACKGROUND OF THE INVENTION

This invention relates to devices for reading and recording magnetic data, and more particularly to means for mounting the carriage/actuators assemblies provided in such devices for controlling the position of transducing heads with respect to rotatable data storage discs.

In one well known type of disc drive, magnetic data is stored on a plurality of horizontally disposed discs, spaced apart from one another and concentrically on a hub rotatable about a vertical axis. One of the recording surfaces of the disc is devoted to servo or positioning data, with the remaining recording surfaces devoted to working data. A carriage supports a plurality of transducing heads, and is movable for selective positioning of the heads generally radially of the discs. The combined carriage movement and disc rotation enable the selective positioning of each of the heads at any desired location over its associated recording surface. The carriage may be either linear or rotary. In either event, a voice coil motor is provided to control carriage movement and position.

Typically, the actuator is a rigid member attached directly to a disc drive deck or housing. The carriage/actuator and housing are subject to vibrations caused by carriage movement spindle rotation, air turbulance and the like, which is high speed and involves frequent reversals in direction. Vibration due to carriage movement causes problems within the drive, particularly at resonant frequencies. For example, a particular frequency (e.g. about 500 hertz) can create resonance and lead to data errors or settle-in delays, when switching from a track seeking mode to a track following mode. At a higher frequency of about 2 killohertz, resonance can lead to data errors due to mechanical misalignment of the working data heads with respect to the servo data head. As manufacturers cf disc drives continually seek to improve such drives by reducing access time of the heads to selected data tracks on the discs, the need to overcome the effects of unwanted vibration becomes all the more critical.

A well known expedient for reducing the energy of vibration transmitted through disc drives is the use of resilient materials to absorb vibrational energy. For example, U.S. Pat. No. 4,216,505 (Grant) discloses a means for damping transducing head vibration in tape drives. In particular, a viscoelastic polymeric layer is mounted between a transducing head shield and a metallic mass, pressing the metallic mass into frictional engagement with the transducing head. Relative displacement between the mass and transducing head is said to dampen vibrations.

U.S. Pat. No. 4,703,470 (Castaga) discloses dynamic absorbing devices for dissipating undesirable vibrations and resonances in a disc drive. A viscoelastic link element is disposed between an absorber base and an absorber mass to counter energy of vibration. The absorber base is mounted directly to the disc drive, for example on the carriage or on the base or housing below the voice coil. In an application not specifically relating to disc drives, U.S. Pat. No. 4,657,361 (Eitel et al) discloses the mounting of viscoelastic damping material between a mirror and a relatively massive mounting plate that supports the mirror, between a collar extended rearwardly of the mirror and a mounting ring that surrounds the collar, and between a rear surface of the collar and a backing plate. The bolts mounting the mounting plate to the mirror are provided with belleville or spring washers to fix the compressive load on the viscoelastic layer between the plate and mirror.

In connection with disc drives, it has been found that providing a layer of a damping tape or viscoelastic polymer between the actuator and housing substantially eliminates problems due to vibration, at least in the short run. Over time, however, the compressible viscoelastic material undergoes a creeping-type or settling deformation, due to bolt torquing or the weight of the relatively massive actuator. Another undesirable result of this deformation is that screws fastening the actuator to the housing, initially tightened to a desired torque, become relatively loose, leading to tilting and ultimately stacking height error in the multiple transducing head arrangement. The low frequency resonance problem noted above becomes more pronounced at this point. The use of belleville washers in connection with the fastening screws has been found beneficial to the extent of maintaining a consistent force upon the elastomeric layer. In spite of the improvement, undesirable creep or deformation occur when using the belleville washers. An uneven deformation of the elastomer can lead to a slight tilting of the actuator and carriage, again resulting in track following errors.

Therefore, it is an object of the present invention to provide a means for mounting a carriage and actuator assembly with respect to the rigid housing of a disc drive, to afford substantial vibration absorption and dissipation without sacrificing the positional integrity of the actuator and carriage.

Another object of the invention is to mount a disc drive actuator to a disc drive housing through a resilient layer in a manner to avoid long term deformation of the resilient layer.

Yet another object is to provide a means for mounting an actuator upon a disc drive housing to substantially prevent vertical displacement of the actuator relative to the housing, yet provide for limited horizontal displacement to generate shear stress and resultant deformation in an elastomeric layer between the actuator and housing.

SUMMARY OF THE INVENTION

To achieve these and other objects, there is provided a data storage apparatus including a substantially rigid housing having a first interface surface. A plurality of data storage discs having data recording surfaces are mounted within the housing to rotate about a common longitudinal axis. A carriage assembly within the housing includes a carriage, a plurality of head support arms extended transversely of the carriage toward the discs, and a plurality of data transducing heads. Each head is supported with respect to one of the arms and is located proximate an associated data recording surface of one of the discs. The carriage is movable so as to move the heads transversely with respect& to the housing. A substantially rigid actuator in the housing controllably moves the carrier to enable a selective positioning cf the transducing heads with respect to the discs. The actuator includes means defining a substantially planar second interface surface. A fastening means secures the actuator with respect to the housing with the first interface surface and second interface surface in parallel and opposed relation to one another. The interface surfaces further are spaced apart a selected longitudinal distance. The fastening means prevents movement of the actuator longitudinally of the housing, but is sufficiently flexible to permit a limited transverse displacement of the actuator with respect to the housing. A resilient damping layer is positioned between the actuator and housing and is contiguous with the first and second interface surfaces.

Preferably the fastening means includes a registration surface of the actuator, and a plurality of substantially rigid spacing members integral with and projected longitudinally of the housing toward the actuator. A plurality of fasteners, which can be externally threaded, maintain the spacing members in surface engagement with the registration surface, for example by insertion into internally threaded openings provided in the spacing members. The preferred form of spacer is a right circular cylinder projected longitudinally or upwardly for positioning against the actuator registration surface.

If desired, an annular cut-out can be formed in the housing at the base of each spacer, to avoid stress concentrations and to effectively increase the length of each spacer. Consequently, the spacers, while substantially rigid in the vertical direction, are sufficiently flexible to allow the desired limited horizontal displacement of the actuator relative to the housing.

Preferably, a substantially planar and uniformly thick damping plate is removably attached to the bottom of the actuator, in which case the bottom surface of the damping plate forms the second interface surface. This expedient avoids the need to position the resilient layer directly against the actuator, and thereby facilitates removal of the actuator from the remainder of the drive from time-to-time, for example for rework purposes all without disturbing or risking damage to the resilient layer.

The preferred resilient layer is a viscoelastic polymer deformable in shear by the transverse displacement of the actuator with respect to the housing. The shear deformation leads to strain amplitudes, resulting in effective energy dissipation and thus more efficient damping.

The spacers cooperate to positively determine the vertical position of the actuator with respect to the housing. Because they bear substantially the entire weight of the actuator, the spacers preserve the elastomeric layer against excessive compression from the weight of the actuator and carriage assembly. Moreover, the length of the spacers can be selected with respect to the somewhat greater thickness of the elastomeric layer, thus to provide for a controlled amount of elastomeric layer compression in the vertical direction. The preferred amount of compression is slight, for example on the order of 5% to 7%, to preserve the capability of the elastomeric layer to dampen vibration through shear deformation. The spacers by virtue of their construction and direct metal-to-metal interface with the actuator, positively prevent any tilting of the actuator and carriage assembly. Thus, the positional integrity of the carriage and actuator are maintained, yet with substantial damping of vibrational energy generated by movement of the carriage.

IN THE DRAWINGS

The above and other features and advantages are more readily appreciated upon consideration of the following detailed description in connection with the drawings, in which:

FIG. 3 is a top plan view of a carriage/actuator assembly of the disc drive of FIG. 1;

FIG. 4 is a perspective view of a damping plate utilized in mounting the carriage/actuator assembly in accordance with the present invention;

FIG. 5 is a top plan view of a damping layer corresponding to the damping plate of FIG. 4; and FIG. 6 is a sectional elevational view illustrating the assembly of the actuator, damping plate and housing.

DETAILED DESCRIPTION OF THE PREFERRED EMBODIMENT

Figure 1:
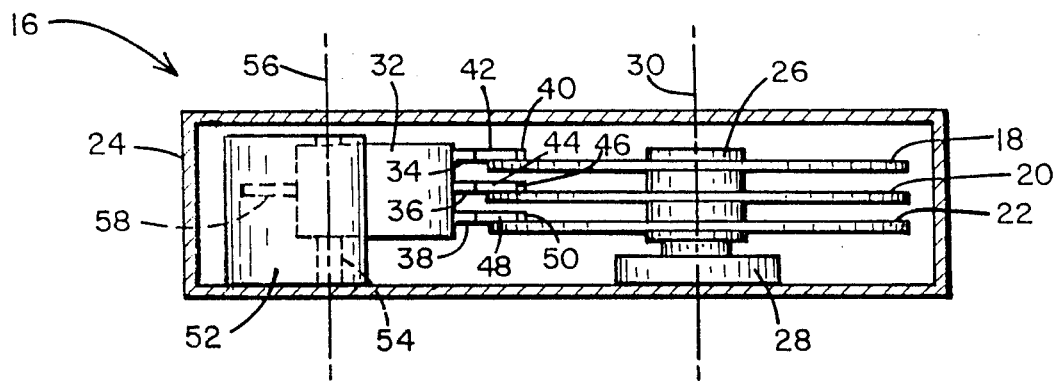
FIG. 1 is a schematic side elevation of a disc drive apparatus constructed in accordance with the present invention.

Turning now to the drawings, there is shown in FIG. 1 a magnetic disc drive 16 suited for storage and retrieval of magnetic data on a plurality of discs 18, 20 and 22 within a rigid cast aluminum deck or housing 24 of the drive. The discs are mounted in a concentric stacked and spaced apart relation, with magnetic recording surfaces of the discs oriented horizontally. The discs further are integral with a central hub 26, and therefore rotate with hub 26 as it is driven by a motor 28 to rotate about a vertical drive axis 30.

Also contained within housing 24 is a carriage/actuator assembly including a substantially rigid carriage 32. Transducing head support arms 34, 36 and 38 are extended horizontally of the carriage and aligned with one another. At its free end remote from carriage 32, arm 34 supports a transducing head 40 through a suspension 42, which can include a flexure and a gimballing means as is well known in the art. Arm 6 similarly supports a suspension 44 and head 46, with arm 38 likewise supporting a suspension 48 and head 50. Each arm supports its associated transducing head in relation to the data recording surface of the associated one of discs 18–22. Each transducing head may contact its associated recording surfaces. Alternatively, and typically in this type of drive, rotation of the discs creates an air foil between each disc and its associated transducing head to suspend the head a slight distance from the surface.

An actuator or voice coil 52 is mounted within the housing for controlling the movement of carriage 32, thereby to control the position of the transducing heads with respect to the discs. More particularly, actuator 52 is a rigid member fixedly mounted with respect to housing 24. A vertical shaft 54 of the carriage, journaled to rotate with respect to the actuator 52, permits rotation of carriage 32 with respect to the actuator and drive housing about a vertical carriage axis 56. To drive and selectively position carriage 32, actuator 52 includes a wire coil or winding which is subjected to an electrical current, in a from manner to move a coil 58 mounted to the carriage.

It is to be recognized that the rotary carriage just described is known in the art. As an alternative, a linearly actuated carriage assembly can appropriately be employed with the mounting of the present invention. In either event, the carriage is movable to selectively), position the transducing heads, generally radially of the discs, so that in combination with rotation of the discs, carriage 32 can be moved to selectively locate any of the transducing heads adjacent a selected or desired location on its associated recording surface.

Transducing heads 40 and 50 read and record working data on their associated recording surfaces. Transducing head 46, conversely, is a servo or positioning transducer, which is used to position a designated one of heads 40 and 50 in accordance with servo data recorded on disc 20. The technique of dedicating a particular disc or recording surface to positioning information is well known, with a single surface of positioning information used in conjunction with multiple data recording surfaces. Also while not illustrated, discs frequently are suited for recording of data on the bottom surface as well as the top surface, in which event each of arms 34-38 supports two transducing heads rather than one.

Figure 2:
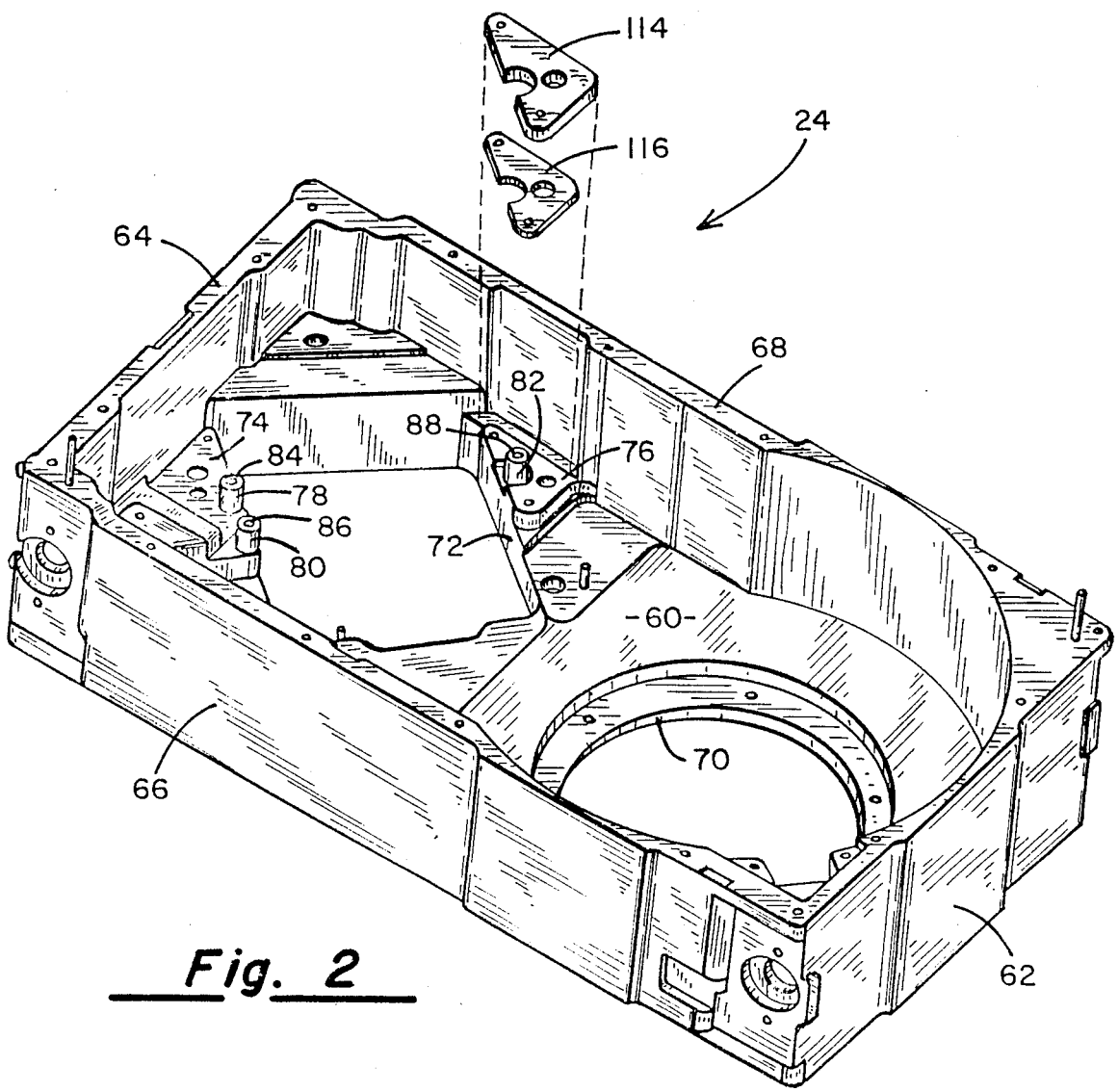
FIG. 2 is a more detailed perspective view of a housing of the disc drive of FIG. 1.

FIG. 2 shows housing 24, with remaining components of the drive being removed to enhance illustration of the housing. The housing includes a floor or base 60, and four upright walls including a forward wall 62, a rearward wall 64 and two side walls 66 and 68. A large circular opening is provided through base 60 at the forward part of the housing, to accommodate the discs and motor 28. A rectangular depression 72 through the rearward portion of the deck is positioned just below the actuator. Base 60 is formed to provide two flat and horizontal landings 74 and 76 on opposite sides of depression 72. Two cylindrical posts or columns at 78 and 80 are integral with and project upwardly from base 60 to a point above landing 74. Likewise, a cylindrical post 82 projects upwardly of the base beyond landing 76 on the opposite side of depression 72. Horizontal top edge surfaces 84, 86 and 88 of the respective posts together define a horizontal plane spaced apart from a plane formed by landings 74 and 76.

As seen from FIG. 3, actuator 52 includes opposed side flange portions 90 and 92 having a shape generally corresponding to that of landings 74 and 76, respectively. Side flanges 90 and 96 are relatively massive, rigid and integral with the remainder of the actuator. In response to actuator 52, carriage 32 travels arcuately as indicated by the arrows at 94 to achieve the desired positioning of heads 40, 46 and 50 radially of their associated discs.

Flange portions 90 and 92 are not seated directly upon landings 74 and 76, but rather are mounted over two respective spacing plates. A spacing plate 96 shown in FIG. 4 corresponds to landing 74, and has a generally triangular shape to facilitate its insertion upon the landing. Plate 96 like housing 24 preferably is constructed of aluminum or other metal, and is formed with a notch 98 to accommodate post 78. Three small internally threaded openings 102, 104 and 106 are provided for fastening plate 96 to flange portion 90 of the actuator as later explained.

Spacer plate 96 is mounted upon landing 74 through a resilient polymeric damping layer 108 shown in FIG. 5. Layer 108 preferably is a thin film or web of a viscoelastic polymer, with a shape corresponding to that of plate 96 including a notch 110 and an opening 112. A preferred material for damping layer 108 is identified as SJ2C15 Type 110 viscoelastic polymer, available under the brand name Scotch damp from the 3M Company of St. Paul, Mn. Layer 108 has a thickness of 0.015 inch, although the preferred thickness does vary with the particular application. Layer 108 is a tape, somewhat "tacky" or pressure-sensitive on both sides, to enable its adhesion to the bottom surface of plate 96 and to landing 74 upon its positioning between these opposed surfaces.

As seen from FIG. 2, a corresponding plate 114 and damping layer 116 are provided for mounting to landing 76.

FIG. 6 illustrates the manner in which actuator 52, specifically at flange portion 90, is mounted with respect to housing 24. Threaded fasteners at 118, 120 and 122 secure plate 96 integrally against the bottom of flange portion 90 of the actuator. The bottom surface 124 of plate 96 thus is integral with the actuator.

Screws 126 and 128 secure actuator flange portion 90 integrally with respect to deck 60. More particularly, a bottom surface 130 of flange portion 90 abuts top edge surfaces 84 and 86 of posts 78 and 80. Thus, the extent to which the posts project upwardly of the remainder of deck 60 determines the spacing between the actuator bottom and deck. Further, in cooperation with the thickness (vertical) dimension of plate 96, these posts determine the vertical spacing between the horizontal bottom surface 124 of plate 96 and landing 74. It is to be understood that post 82 on the opposite side of the drive is secured to flange portion 92 of the actuator in a similar manner, and cooperates with posts 78 and 80 to fix the vertical location of the actuator with respect to the housing, in particular the floor or base.

Thus, the plate bottom surface 124 and landing 74 provide parallel and opposed interfacing surfaces, with viscoelastic polymer layer 108 occupying the space between the interfacing surfaces and contiguous with both surfaces. To insure that layer 108 contacts both of surfaces 124 and 74, it is advantageous to select a nominal or unstressed thickness for layer 108 which exceeds the vertical separation between the interfacing surfaces. In this particular embodiment, a thickness of 0.015 inch, in combination with a vertical separation of 0.014 inch between the interfacing surfaces, has been found satisfactory.

Moreover, the thickness of polymer layer 108 is selected in accordance with two contravaling concerns. First, the thickness should be sufficient to accommodate compression as described above, with the amount of compression being a small fraction of nominal, unstressed thickness, for example, about six percent as in the above example. Conversely, the ability of polymer layer 108 to absorb vibrational energy is enhanced as the amount of strain due to shear increases. For a given horizontal displacement of the actuator with respect to the deck, the strain component decreases as the thickness of the layer is increased. In short, performance criteria and tolerance levels determine the thickness of the polymer layer for a specific application.

Columns 78, 80 and 90 are likewise designed to suit specific applications. In particular, the height and diameter of the cylindrical posts are selected to provide a resonant frequency which is intermediate or non-harmonic with respect to the resonant frequencies of the actuator and housing. For example, in the present embodiment, resonant frequencies occur at about 500 Hz, 1 Khz and 2 Khz. Accordingly, posts 78, 80 and 82 are dimensioned (height of about ½ inch and diameter of about ⅜ inch) to yield a resonant frequency of about 800 Hz.

As indicated at 132 and 134, an annular cut-out is formed into floor 60 at the base of posts 78 and 80. The rounded surface of the cut-outs avoids stress concentrations, and further effectively increase the length of the posts, for reasons to be explained.

In practice, the actuator/carriage assembly is assembled onto deck 60 first by applying polymeric layer 108 to bottom surface 124 of plate 96. Polymeric layer 116 similarly is fastened to its associated plate 114. Plates 96 and 114 then are fastened to the housing, specifically at landings 74 and 76, respectively, to position layers 108 and 116 in contact with landings 74 and 76, respectively. If desired, a primer can be applied to the plates and landings prior to applying the damping layers. The actuator than is placed into the drive and the threaded fasteners 126, 128 and their counterpart (not illustrated) are fastened into base 60, securing each of top edge surfaces 84, 86 and 88 against the horizontal bottom surface of the actuator, which acts as a registration surface to precisely, vertically position the actuator relative to the deck. This fastening step also positions the bottom surfaces of plates 96 and 114 the requisite 0.014 inch above landings 76 and 74, which slightly compresses polymeric layers 108 and 116 to insure their intimate contact with both interfacing surfaces. Heat curing is used to insure proper adhesion.

As carriage 32 is rotated during use of the disc drive, it translates motion components, and vibrationally excites actuator 52, which causes a slight, temporary horizontal displacement of actuator 52 with respect to base 60, due to the configuration of posts 78, 80 and 82. More particularly, the length of each of these posts is greater than the diameter. This, together with the metallic construction and presence of internally threaded openings in the posts to accommodate the corresponding threaded fasteners, provides a connection to the actuator which yields slightly in horizontal directions although it is rigid vertically. Viscoelastic layer 108, contiguous with and adhering to the interfacing surfaces of plate 96 and deck 60, is subjected to strain in shear as a result of this horizontal displacement. It is the shearing of this layer and similarly of layer 116 which substantially dissipates the energy of vibration, thus reducing amplitudes of resonant frequency problems identified at about 500 Hz and 2000 Hz. Thus, in accordance with the present invention, the actuator/carriage assembly is mounted in a vertically fixed manner, yet with substantial dissipation of vibrational energy to eliminate seeking errors and data errors, and in resulting in more rapid data access times.

What is claimed is:

1. A data storage apparatus including:
   a substantially rigid housing having a first interface surface, and a plurality of data storage discs mounted within the housing to rotate about a common axis extended in a longitudinal direction, said discs having substantially planar and transverse data recording surfaces;
   a carriage assembly within said housing including ga carriage, a plurality of head support arms extended transversely from said carriage toward said discs, and a plurality of data transducing heads, each head supported by a respective one of said arms and disposed proximate one of the data recording surfaces of an associated one of said discs, said carriage being movable with respect to the housing to move said heads transversely;
   a substantially rigid actuator in said housing for controllably moving said carriage to enable a controlled variable positioning of said transducing heads with respect to said discs, said actuator including means defining a substantially planar second interface surface;
   one of said housing and said actuator having a registration surface longitudinally displaced from at least one of said first interface surface and said second interface surface;
   fastening means including a substantially rigid spacing means integral with the other of said housing and said actuator and projected longitudinally toward the registration surface, and means for maintaining said spacing means engaged with the registration surface, said fastening means securing said actuator with respect to said housing with said first interface surface and second interface surface in parallel and opposed relation to one another and spaced apart in said longitudinal direction a selected distance, said fastening means substantially preventing movement of said actuator relative to said housing in said longitudinal direction, but sufficiently flexible to permit a limited transverse displacement of the actuator with respect to the housing; and
   a resilient damping layer between said actuator and said housing and contiguous with said first and second interface surfaces, said damping layer undergoing shear strain in response to said limited displacement.

2. The data storage apparatus of claim 1 wherein:
   said actuator has said registration surface; said spacing means include a plurality of substantially rigid spacing members integral with and projected from said housing toward actuator in said longitudinal direction; and said fastening means include a plurality of fasteners, one fastener associated with each of said spacing members, for maintaining its associated spacing member engaged with said registration surface.

3. The data storage apparatus of claim 2 wherein:
   said longitudinal direction is vertical, and said first and second interface surfaces are flat and horizontally disposed.

4. The data storage apparatus of claim 3 wherein:
   said registration surface is substantially planar and horizontal, and each of said spacing members engages the registration surface over a substantially horizontal end surface thereof.

5. The data storage apparatus of claim 4 wherein:
   said fasteners are externally threaded and each of said spacing members is internally threaded for receiving its associated one of the fasteners.

6. The data storage apparatus of claim 4 wherein:
   each of said spacing members comprises a vertically oriented cylindrical column, with a length of each column exceeding its diameter.

7. The data storage apparatus of claim 6 further including:
   means defining a circular cut-out in said housing surrounding each of said columns at a base thereof, thereby effectively increasing the length of each column.

8. The data storage apparatus of claim 1 wherein:
   said means defining said second interface surface include a substantially rigid plate disposed between said actuator and said housing and having a substantially uniform thickness, and means for integrally and releasably securing said plate to said actuator, with a surface of said plate remote from the actuator comprising said second interface surface.

9. The data storage apparatus of claim 1 wherein:

said resilient sampling layer is maintained in slight elastic compression in said longitudinal direction.

10. The data storage apparatus of claim 9 further including:
adhesive layers securing said resilient damping layer to said housing and said actuator.

11. The data storage apparatus of claim 10 wherein:
said resilient damping layer consists essentially of a viscoelastic polymer deformed by said limited transverse displacement of the actuator with respect to the housing.

12. The data storage apparatus of claim 1 wherein:
said resilient damping layer is adhered to said first interface surface and to said second interface surface.

13. The data storage apparatus of claim 6 wherein:
said cylindrical columns are constructed of metal and have heights and diameters selected to provide in each of the columns a resonant frequency non-harmonic with respect to resonant frequencies of the actuator and housing.

* * * * *

UNITED STATES PATENT AND TRADEMARK OFFICE
CERTIFICATE OF CORRECTION

PATENT NO. : 4,982,300

DATED : January 1, 1991

INVENTOR(S) : Kent J. Forbord

It is certified that error appears in the above-identified patent and that said Letters Patent is hereby corrected as shown below:

Column 7, line 54, "including ga" should read -- including a --.

Column 8, line 30, after "toward" insert -- said --.

Column 9, line 1, "sampling" should read -- damping --.

Signed and Sealed this

Twelfth Day of May, 1992

Attest:

DOUGLAS B. COMER

Attesting Officer

Acting Commissioner of Patents and Trademarks